United States Patent
Gnali

(10) Patent No.: US 12,269,300 B2
(45) Date of Patent: Apr. 8, 2025

(54) INSERT FOR VEHICLE WHEEL AND VEHICLE WHEEL COMPRISING THE INSERT

(71) Applicant: Oscar Ettore Gnali, Lumezzane (IT)

(72) Inventor: Oscar Ettore Gnali, Lumezzane (IT)

(73) Assignee: Oscar Ettore Gnali, Lummezzane (IT)

( * ) Notice: Subject to any disclaimer, the term of this patent is extended or adjusted under 35 U.S.C. 154(b) by 223 days.

(21) Appl. No.: 17/961,495

(22) Filed: Oct. 6, 2022

(65) Prior Publication Data

US 2023/0143222 A1 May 11, 2023

(30) Foreign Application Priority Data

Oct. 4, 2021 (IT) .................. 102021000025376

(51) Int. Cl.
*B60C 17/04* (2006.01)
*B60C 17/06* (2006.01)

(52) U.S. Cl.
CPC ........ *B60C 17/06* (2013.01); *B60C 2017/068* (2013.01)

(58) Field of Classification Search
CPC ..... B60C 17/065; B60C 17/009; B60C 17/00; B60C 17/06; B60C 17/04; B60C 2017/068
See application file for complete search history.

(56) References Cited

U.S. PATENT DOCUMENTS

| | | | | |
|---|---|---|---|---|
| 1,413,872 A | | 4/1922 | Perry | |
| 1,789,761 A | * | 1/1931 | Krone | ............... B60C 17/045 |
| | | | | 152/158 |
| 3,212,548 A | * | 10/1965 | Drazin | ................ B60B 21/12 |
| | | | | 152/158 |
| 5,800,643 A | * | 9/1998 | Frankowski | ............ B60C 17/06 |
| | | | | 152/518 |

(Continued)

FOREIGN PATENT DOCUMENTS

| | | |
|---|---|---|
| CN | 101456336 A | 6/2009 |
| CN | 104527335 A | 4/2015 |
| DE | 10138410 A1 | 2/2003 |

(Continued)

OTHER PUBLICATIONS

Search Report for IT 102021000025376 dated Apr. 22, 2022, Munich, DE.

(Continued)

*Primary Examiner* — Cedrick S Williams
(74) *Attorney, Agent, or Firm* — Ferguson Case Orr Paterson

(57) ABSTRACT

An insert for a vehicle wheel suitable for being inserted in an inner annular cavity resulting between a tire and a rim of the vehicle wheel is provided. The insert has an annular element that extends in a circumferential direction (C) about a main axis (X-X), and is made in one piece of polymeric material. Dips or protrusions formed on the annular element extend about the circumferential direction (C) and along a respective preferential extension direction (A-A), which lies (Continued)

on a plane secant to the circumferential direction (C). A vehicle wheel having a tire, a rim, and the insert suitable for being inserted in an inner annular cavity resulting between the tire and the rim of the vehicle wheel is also provided.

18 Claims, 6 Drawing Sheets

(56) References Cited

U.S. PATENT DOCUMENTS 10,821,786 B1 \* 11/2020 Roberts ............... B29C 33/0022

FOREIGN PATENT DOCUMENTS

| EP | 3317124 | 3/2020 |
| GB | 2092531 | 2/1982 |
| GB | 2571980 | 6/2021 |

OTHER PUBLICATIONS

EPO communication pursuant to Rule 114(2) EPC issued in European Application No. 22199164.9 issued Jul. 25, 2024.
Examination Report issued in the European Application No. 22199164.9 issued Aug. 22, 2024.

\* cited by examiner

INSERT FOR VEHICLE WHEEL AND VEHICLE WHEEL COMPRISING THE INSERT

CROSS-REFERENCE TO RELATED APPLICATION

This application claims priority to Italian Patent Application No. 102021000025376 filed on Oct. 4, 2021, the contents of which are incorporated by reference in their entirety.

FIELD OF THE INVENTION

The present invention relates to an insert for a vehicle wheel and a vehicle wheel comprising said insert.

In general, the present invention relates to the field of inserts for vehicle wheels, particularly, but not exclusively, for off-road vehicles, such as dirt bikes and motorcycles, enduro bikes, and the like.

In particular, but not exclusively, the present invention applies to wheels onto which tires of the tubeless type are mounted.

BACKGROUND OF THE INVENTION

At least in the field of off-road vehicles, the possibility is known to insert polymer foam inserts inside the tires to limit puncture phenomena and to improve dynamic performance of the tire during stresses received from terrain during rides. According to the prior art, said type of inserts comprises annular-shaped elements conformed to adhere and push at least partially on the inner walls of the tire to impart the appropriate dynamic performance during operation.

Typically, said inserts are toroidal in shape with a solid circular cross-section or have a notch which extends about the perimeter of the insert, along the circumferential direction of the annular element, creating a circumference concentric to the main axis of the insert.

Inconveniently, said inserts apply a given thrust pressure on the tire walls and are in contact with the rim, also at the inflation valve attachment points. Because of the contact with the attachment points, passage of air during inflation may be obstructed or hindered by the insert itself.

Furthermore, the insertion of sealing fluid is also blocked or hindered because of the insert.

In addition, said type of inserts is not suitable for use also on normal road vehicles. Indeed, inserts of the prior art completely fill the tire for completely replacing air and simulating pressures that ensure tire support. The wear of these inserts is early and is caused by the heat created between the ground and the tire and also by internal rubbing occurring between the insert, the rim, and the tire.

To solve said problems, anti-puncture inserts for tubeless tires are known in the prior art, which have small notches with radial direction on the lateral walls of the insert itself, i.e., on the walls which face the sides of the tire. Said notches, if positioned at the valve attachment points, promote passage of air during inflation, preventing obstruction due to the contact between the surface of the insert and the rim itself, at said notches.

Disadvantageously, said inserts are neither practical in use nor functional in insertion. Indeed, when placing the insert in the inner cavity which is formed between the tire and the rim, it must be ensured that at least one of the notches is located at the valve attachment point. Therefore, it is necessary to adjust placement of the insert in the cavity by applying rotations until the position of at least one notch matches the position of the inflation valve.

Inconveniently, it is also apparent that in such inserts only the notch located at the inflation valve is functional in use, while the other notches located along the rest of the circumference of the insert are superfluous.

SUMMARY OF THE INVENTION

It is an object of the present invention to overcome the drawbacks of the prior art and, more specifically, to provide a tire insert capable of facilitating passage of air and/or liquid or foam during inflation.

It is a further object of the present invention to enable faster, more uniform and homogeneous distribution of air inside the vehicle wheel.

It is an even further object of the present invention to facilitate placement of the insert inside the annular cavity of the wheel without requiring excessive adjustments to make the inflation valve match with a particular cavity of the insert.

Said objects are achieved with an insert and a vehicle wheel as described and claimed herein.

Preferred or advantageous embodiments are also described.

BRIEF DESCRIPTION OF THE FIGURES

The features and advantages of the insert for a vehicle wheel and the vehicle wheel will be apparent from the following description which illustrates some preferred embodiments, given by way of indicative, non-limiting examples, with reference to the accompanying figures, in which.

DETAILED DESCRIPTION

Figure 2:
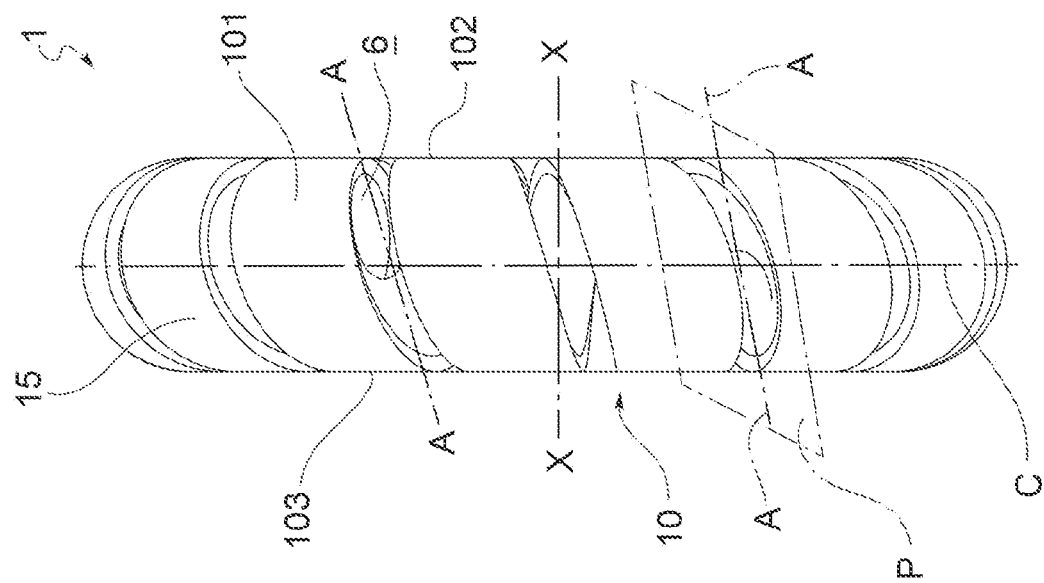
FIG. 2 shows a front view of the insert for vehicle wheel in FIG. 1.
Figure 1:
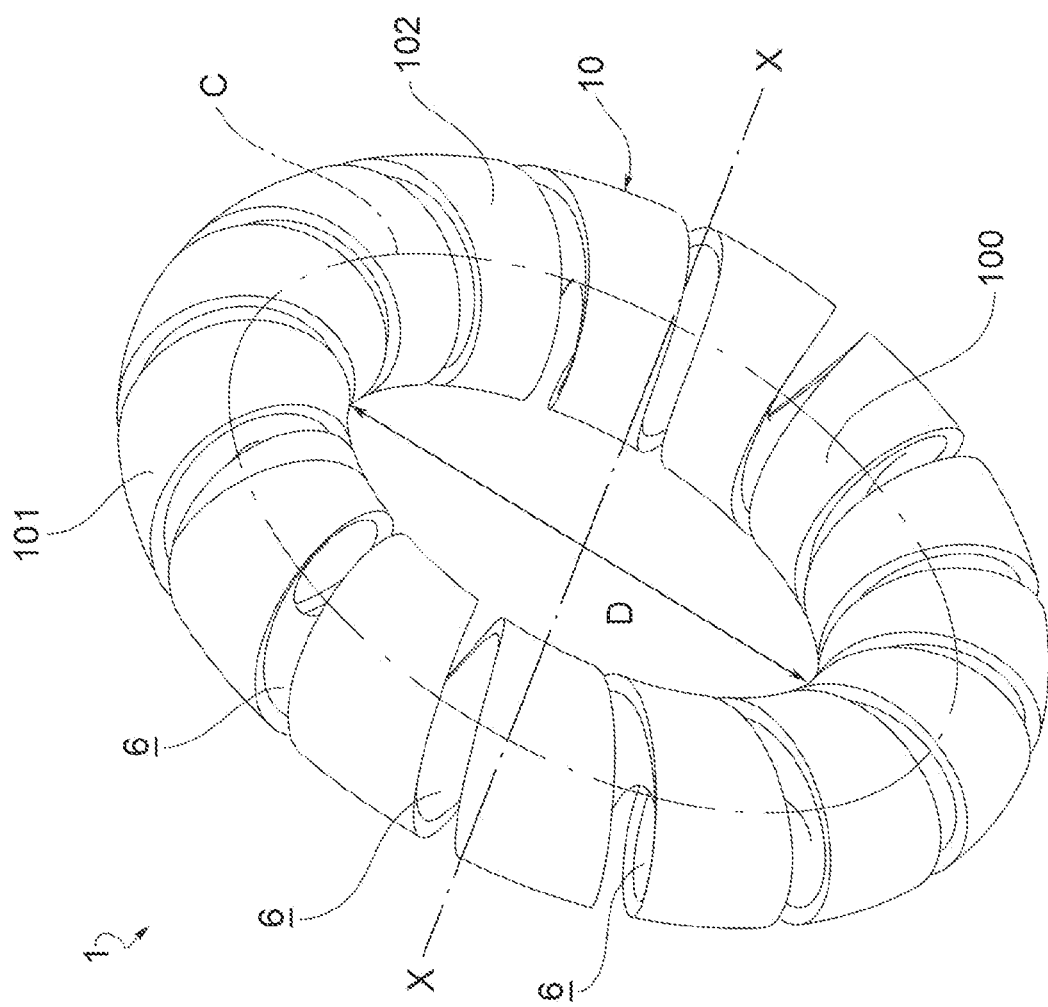
FIG. 1 shows an axonometric view of an insert for vehicle wheel according to an embodiment of the present invention.
Figure 4:
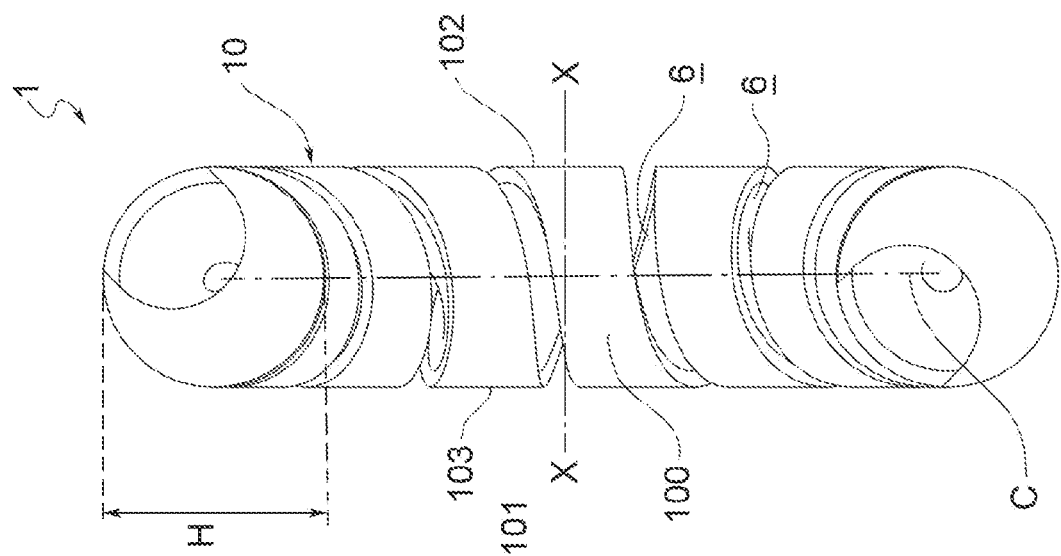
FIG. 4 shows a section view of the insert for vehicle wheel in FIG. 1.
Figure 3:
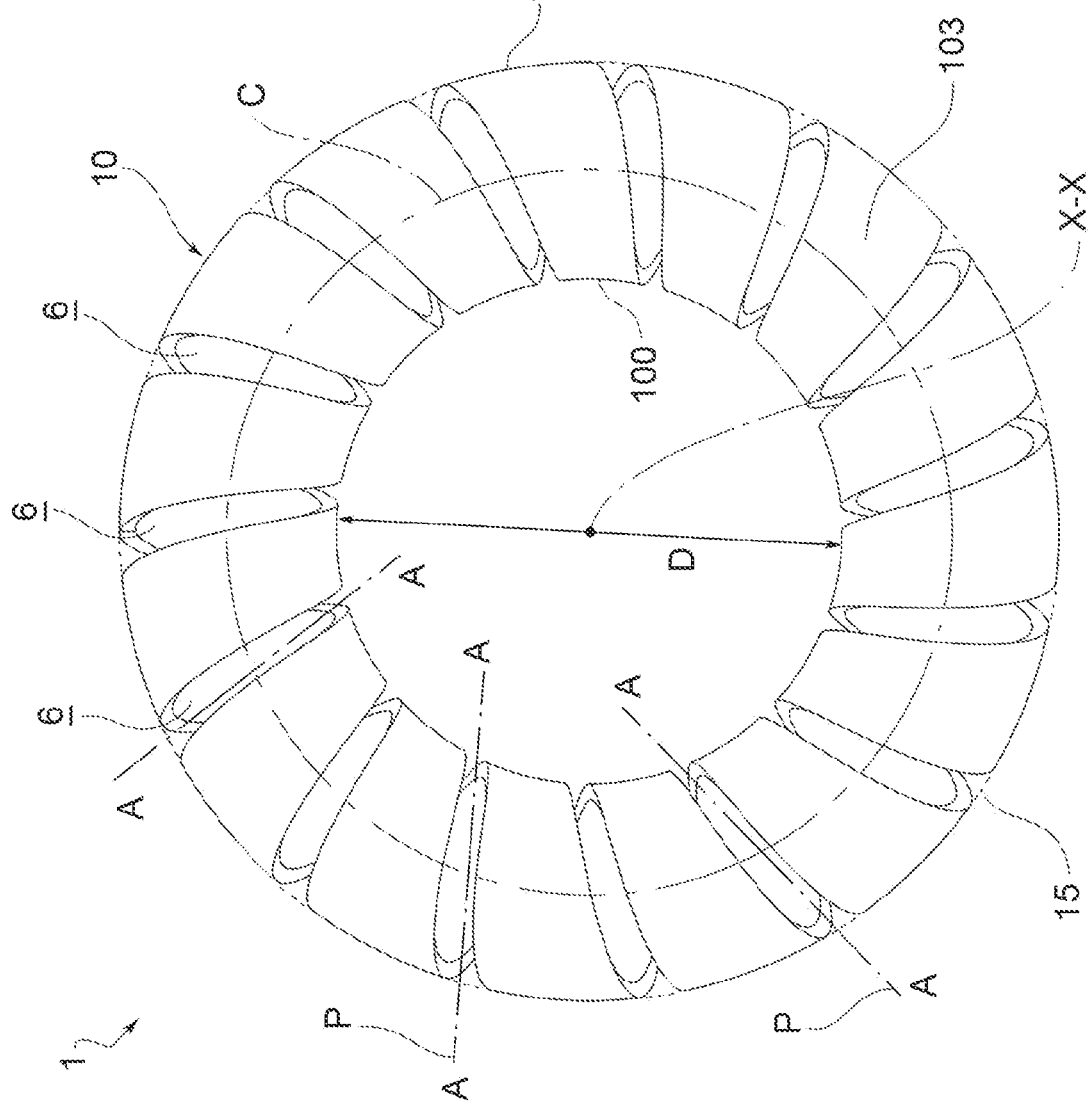
FIG. 3 shows a side view of the insert for vehicle wheel in FIG. 1.
Figure 6:
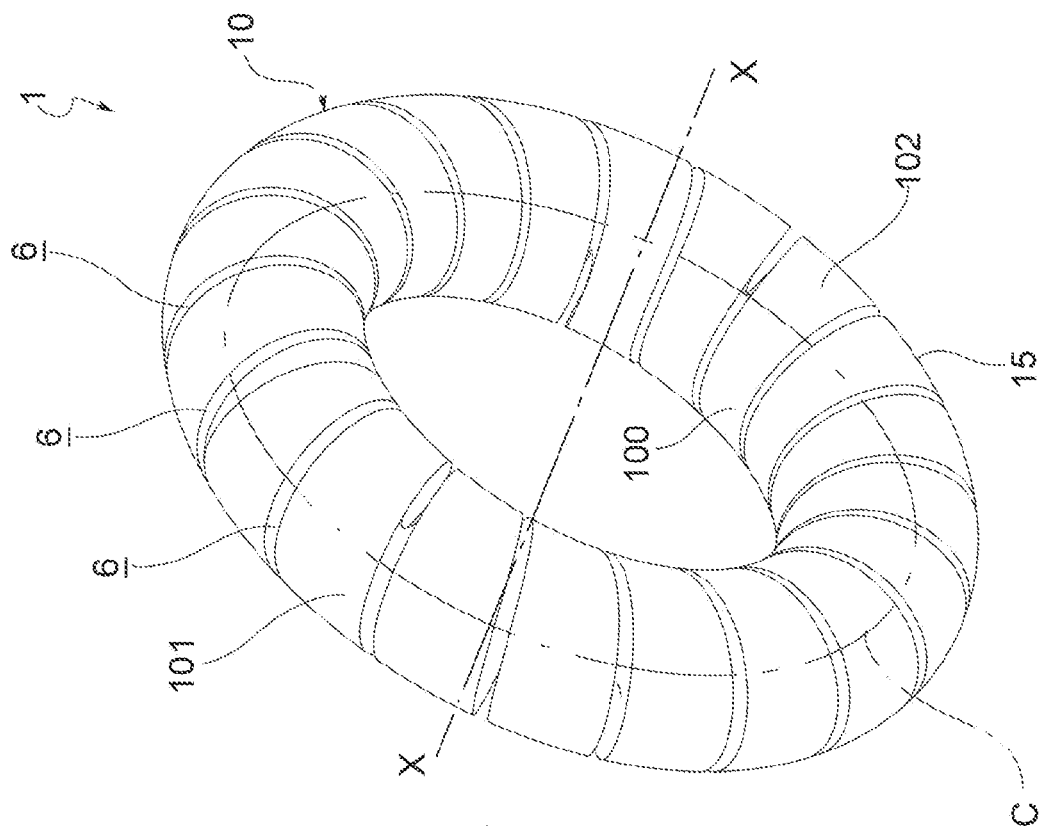
FIG. 6 shows an axonometric view of an insert for vehicle wheel according to a yet further embodiment of the present invention.
Figure 5:
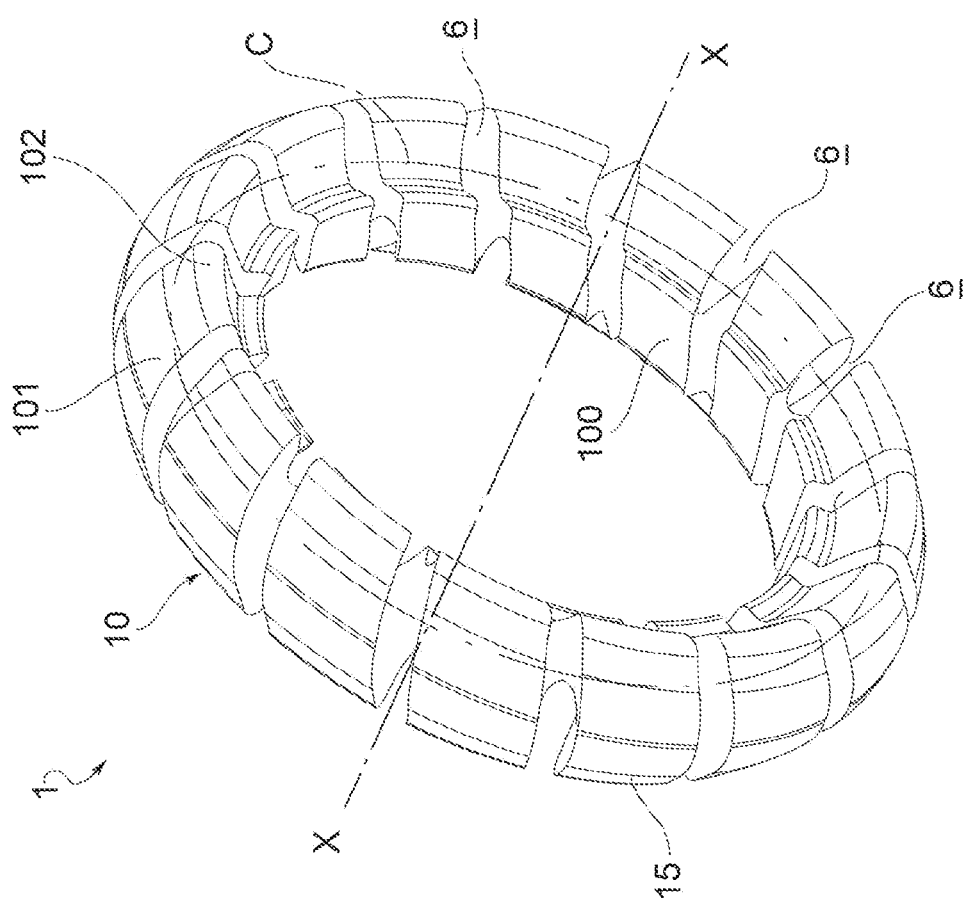
FIG. 5 shows an axonometric view of an insert for vehicle wheel according to a further embodiment of the present invention.
Figure 7:
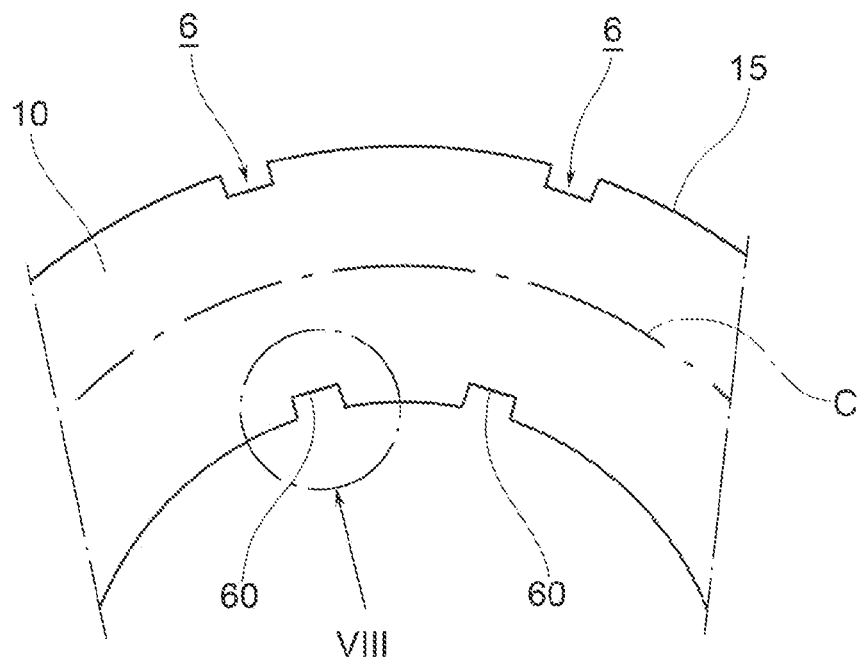
FIG. 7 shows a partial view of a section of the insert taken along the plane containing the circumferential direction C according to an embodiment of the present invention.
Figure 8:
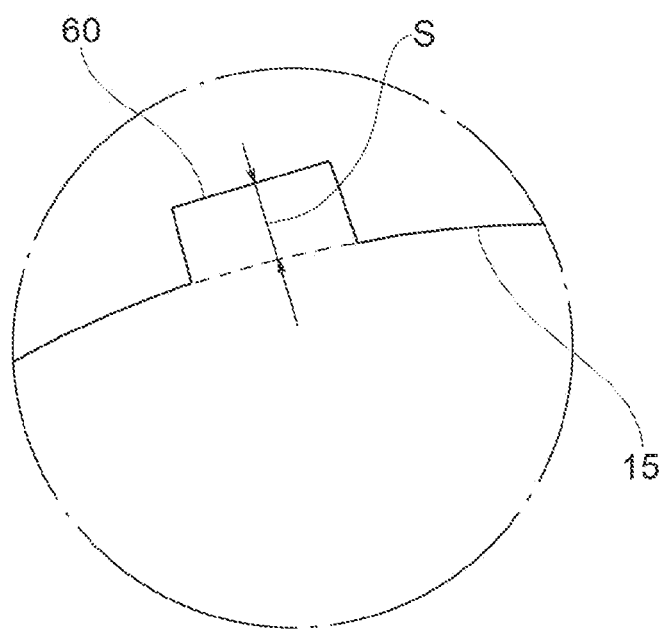
FIG. 8 shows a detailed view of a detail in FIG. 7.
Figure 10:
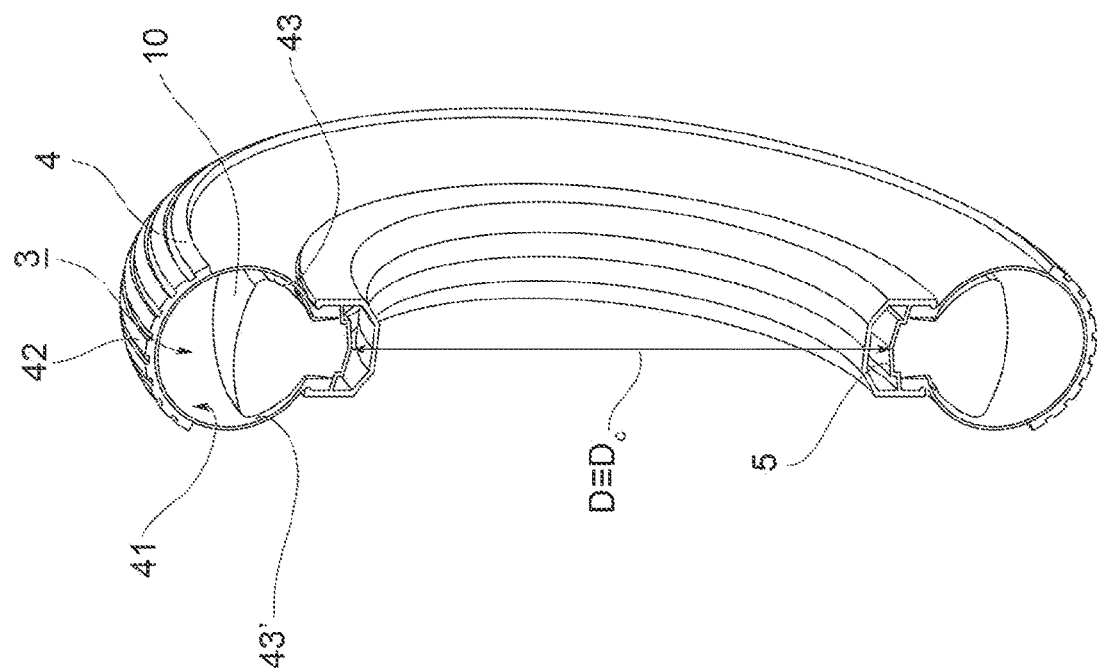
FIG. 10 shows an axonometric view of a cross-section of the wheel in FIG. 8, according to an embodiment of the present invention, in which a tire insert according to an embodiment of the present invention housed inside the wheel tire is also visible.
Figure 9:
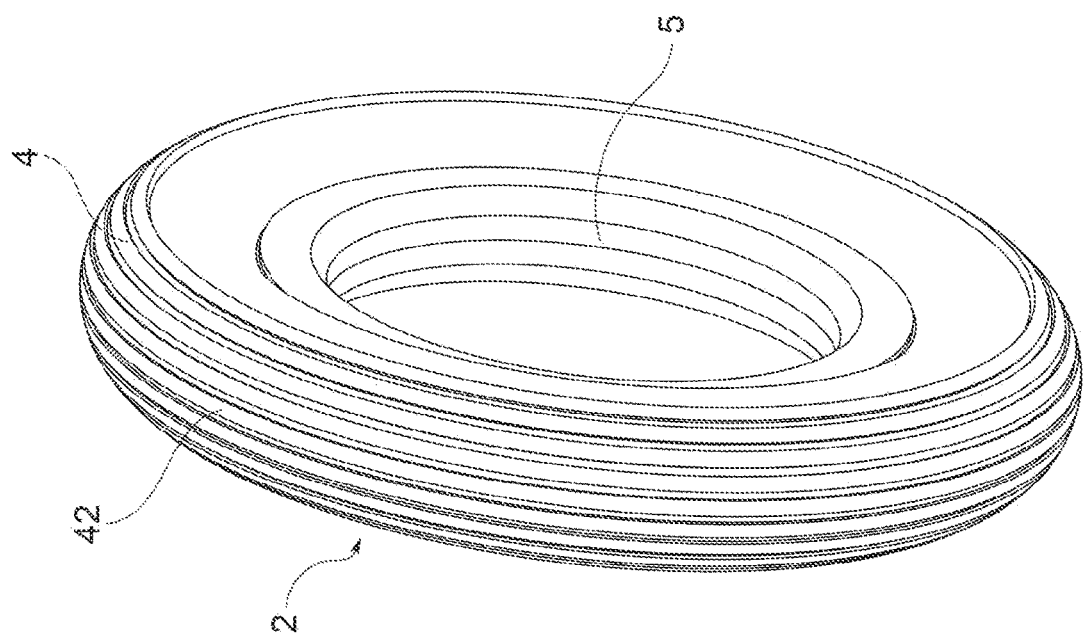
FIG. 9 shows an axonometric view of a vehicle wheel according to the present invention.
Figure 11:
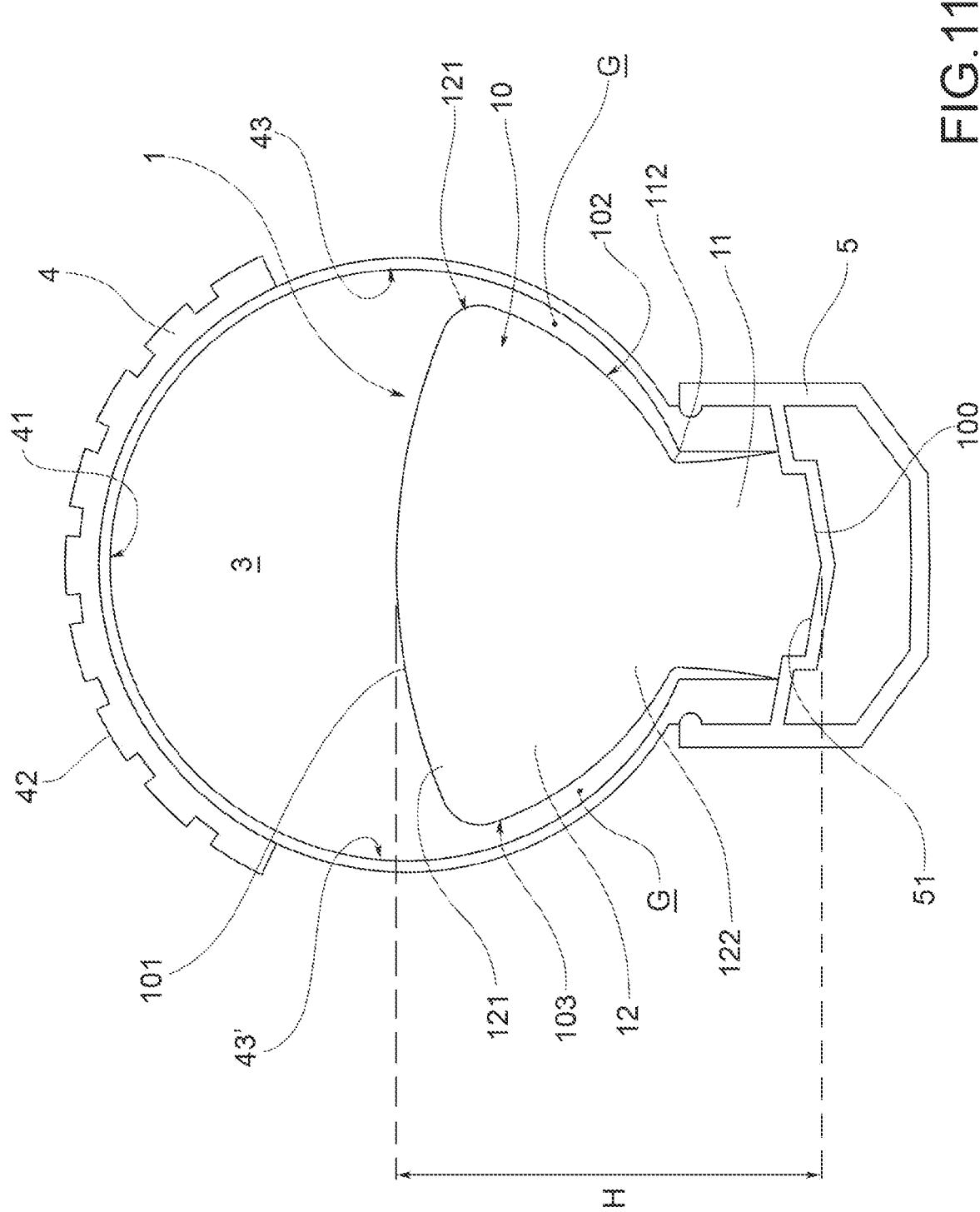
FIG. 11 shows a front plan view of a section of a vehicle wheel according to an embodiment of the present invention, in which a tire insert is inserted inside according to an embodiment of the present invention.

With reference to the accompanying figures, reference numeral 1 indicates an insert for a vehicle wheel 2 as a whole.

The insert 1 is suitable for insertion into an inner annular cavity 3, which results between a tire 4 and a rim 5 of the vehicle wheel 2.

Preferably, the vehicle wheel 2 comprises a tire 4 of the tubeless type.

According to the present invention, the insert 1 comprises an annular element 10 which extends in a circumferential direction C about a main axis X-X. In other words, the annular element 10 is shaped as a ring which extends in revolution about a center lying on the main axis X-X. Preferably, the circumferential direction C is understood as a circumferential direction lying on inner points of the annular element 10 corresponding to the baricenter or center of mass of the cross-section of the annular element 10.

According to the present invention, the insert 1 is made in one piece and is made of polymeric material.

Preferably, the polymeric material is any material chosen from the group comprising polyurethane, polystyrene, rubber, foam-rubber, open-cell or closed-cell foam, and solid-skin foam.

According to the present invention, the insert 1 has an upper surface 101 suitable for facing towards an inner tread side 41 opposite to a tread 42 of the tire 4 and arranged in the inner annular cavity 3, a right sidewall 102 and a left sidewall 103 suitable for facing towards a right lateral wall 43 and a left lateral wall 43' of the tire 4, respectively, and a lower surface 100 suitable for at least partially coming into contact with the rim 5 of the vehicle wheel 2.

A person skilled in the art will unambiguously understand that, in the present description, the terms "right," "left," "top," and "bottom" are used to define the characteristics of the insert with reference to a tire viewed from the front (or from the rear), in the direction of travel of a vehicle, thus imagining the insert in assembly with a tire.

According to the present invention, dips 6 or protrusions are formed on the annular element 10 relative to a main encumbrance surface 15 of the annular element 10. The dips 6 or protrusions each extend at least partially on the upper surface 101, on the lower surface 100, on the right sidewall 102, and on the left sidewall 103 of the annular element 10, about the circumferential direction C and prevalently along a respective preferential extension direction A-A, which lies on a plane P secant to the circumferential direction C, so that passage of air during tire inflation is facilitated when a point of air injection into the wheel is situated at one of the dips 6 or between two of the protrusions.

The preferential extension direction A-A is secant to the circumferential direction C at an angle which may be perpendicular or non-perpendicular, e.g., an acute angle.

The term "dips" 6 refers, in the present description, to cavities made in the annular element 10, e.g., by means of notches or incisions or, preferably, obtained as a result of hot molding the insert in a mold specially conformed to obtain the dips.

The term "protrusions" refers, in the present discussion, to reliefs, or ribs, or protuberances, which protrude from the annular element 10.

The term "main encumbrance surface" 15 indicates the maximum area that the annular element 10 occupies without comprising the dips 6 or protrusions.

It is apparent that if dips 6 are made in the annular element, they extend below the main encumbrance surface 15, i.e., they are dug to a given depth under the main surface, i.e., the minimum point 60 of the dip is located closer to the circumferential direction C than the main encumbrance surface 15.

It is equally apparent that, if the protrusions are obtained out on the annular element 10, they extend beyond the main encumbrance surface 15, i.e., they protrude outwards from the main encumbrance surface 15 by a given thickness, i.e., the maximum point of the protrusion is located farther from the circumferential direction C than the main encumbrance surface 15.

According to an embodiment of the present invention, the dips 6 or protrusions extend continuously about the annular element 10 at least along the respective preferential extension direction A-A, said respective preferential extension direction A-A extending at least for one complete turn about the circumferential direction C.

In other words, in said embodiment, the dips are either closed curves, e.g., circumferences, about the circumferential direction C, or are open curves, e.g., coils about the circumferential direction C.

The term "coils" refers to a curve with a three-dimensional extension having a start extremity and an end extremity, which do not match each other.

According to an alternative embodiment of the present invention, the dips 6 or protrusions extend only for a stretch of the annular element 10 along the preferred extension direction A-A.

Preferably, the dips 6 or protrusions extend about the entire circumferential direction C, i.e., along the entire extension of the annular element 10, along the preferred extension direction A-A.

In other words, according to said embodiment, the preferential extension direction A-A follows a curve which goes around the entire circumferential direction C with a dip start end and a dip end either coinciding with or lying on the same plane secant to the circumferential direction C.

Alternatively, the dips 6 or protrusions extend only around a stretch of said circumferential direction C.

Preferably, the dips 6 or protrusions have a spiral pattern about the circumferential direction C.

In other words, in said configuration, the preferential extension direction A-A cuts the circumferential direction C at a non-perpendicular angle.

Even more preferably, the dips 6 or protrusions are a spiral-shaped single cavity or protrusion which turns about the circumferential direction C throughout the whole annular element 10.

Preferably, the annular element 10 is a toroid solid on which said dips 6 or protrusions are cut.

According to an embodiment, the annular element 10 is a spiral which turns about the circumferential direction C.

For the sake of simplicity, in the present description, "toroid" means any solid resulting from the revolution around the main axis X-X of any plane section, e.g., a section having as its perimeter a circumference, or an ellipse, or a closed curve, or a break, or a polygon.

According to an advantageous embodiment, the annular element 10 is a full solid on which the dips 6 are made only partially within the generating section of the toroid solid, i.e., they have a depth less than 50% of the total radial height H of the insert 1.

According to an alternative embodiment, the annular element is almost completely emptied by the dips 6, i.e., the depth of the dips 6 is greater than 50% of the total radial height H of the insert 1. In other words, the annular element is hollow along the circumferential direction C.

According to an embodiment of the present invention, the annular element 10 is suitable for at least partially coming into contact with the tire 4.

According to an embodiment, the insert 1 is conformed to have shape and size to be always in contact with the tire 4 when the tire is inflated to a predetermined standard working pressure.

According to an embodiment, the insert 1 is conformed to have shape and size to be always distanced from the tire 4 when the tire is inflated to a predetermined standard working pressure. Furthermore, in this variant, the shape and size are such that, on the other hand, when the tire is deflated or when the tire has a pressure much lower than the predetermined standard working pressure, the insert comes into contact with the tire to support the tire while the wheel is running. This feature allows the tire to be supported when it is punctured or there is a sharp pressure drop, and at the same time allows not to interfere with performance of the tire when the tire is properly inflated by virtue of the fact that the insert 1 is not in contact with the tire and applies no pressure on the tire.

According to a particularly advantageous embodiment, the annular element 10 comprises a base portion 11, suitable for being accommodated in a rim seat 51 of the rim 5, and an enlarged portion 12, having a section larger than the base portion 11.

Preferably, the upper surface 101 has a convex shape suitable for coming into contact, at least partially, with the tire 4 when the tire is deflated and not touching tire 4 when it is inflated to a predetermined working pressure, instead.

Preferably, the enlarged portion 12 and the base portion 11 are conformed to have shape and size such that the enlarged portion 12 and the base portion 11 always remain distanced from the tire 4.

Furthermore, the enlarged portion 12 preferably has a bowl- or cup-shaped section.

The enlarged portion 12 is conformed to have shape and size such that the enlarged portion 12 is always distanced from the tire 4 when the tire is inflated to a predetermined standard working pressure. Furthermore, the shape and size of the enlarged portion 12 are such that, on the other hand, when the tire is deflated or when the tire has a pressure much lower than the predetermined working pressure, the enlarged portion 12 makes contact with the tire to support it while the wheel is running. This effectively allows the tire to be supported when it is punctured or there is a sharp pressure drop, and at the same time allows not to interfere with performance of the tire when the tire is properly inflated by virtue of the fact that the insert 1 is not in contact with the tire and applies no pressure on the tire.

According to an embodiment, the enlarged portion 12 is conformed so that there is a space G interposed between the enlarged surface 12 and the right lateral wall 43 and the left lateral wall 43' of the tire 4 so that the space G has a decreasing course starting from the insert portion 121 farthest from the rim 5 to the insert portion 122 closest to the rim 5 when the tire is inflated to a predetermined standard working pressure. In other words, the volume of the space G interposed between the enlarged portion 12 and the tire 4 decreases as a portion of the volume of the space G closest to the rim 5 is considered.

For example, in an embodiment, said feature is obtained by an enlarged portion shape 12 comprising the right sidewall 102 of the insert and the left sidewall 103 of the insert in a convex shape, arranged facing the right wall 43 and the left wall 43' of the tire. In particular, said right sidewall 102 and left sidewall 103 of the insert are shaped as a portion of a parabola or hyperbola.

According to an advantageous embodiment, the enlarged portion 12 has a bowl-shaped section, with an upper surface 101 having convexity facing the inner side tread 41 of the tire. In this variant, the upper surface 101 joins the right and left sidewalls 43, 43' of the insert 1, forming a totally convex enlarged portion section.

According to an embodiment, the base portion 11 has a neck shape and comprises the lower surface 100 suitable to support the rim 5. Furthermore, an upper neck base 112, which is joined to the enlarged portion 12, is tapered relative to the lower surface 100, i.e., it has a lower section.

According to a preferred embodiment, the dips 6 or protrusions have a depth S or thickness comprised between 5% and 90% of the total radial height H of the insert 1, respectively.

The term "depth" of the dip means the distance between the main encumbrance surface 15 defined above, and the minimum dip point.

The "thickness" of the protrusion means the distance between the main encumbrance surface 15 and the maximum protrusion point.

Preferably, the dips 6 or protrusions have a depth S or thickness comprised between 20% and 70% of the total radial height H of the insert 1, respectively.

Even more preferably, the dips 6 or protrusions have a depth S or thickness comprised between 50% and 60% of the total radial height H of the insert 1, respectively.

Preferably, the dips 6 or protrusions have a width between 3% and 40% of the length of the dip or protrusion along the respective direction of preferential extension. Width of the dip or protrusion means the distance calculated along a direction perpendicular to the preferential extension direction (A-A). For example, the width of the dip or protrusion is comprised between 3 millimeters and 80 millimeters, preferably between 20 millimeters and 50 millimeters.

Preferably, the insert 1 is made entirely of a polymeric foam material.

Even more preferably, the insert 1 is made entirely of ethylene vinyl acetate (EVA).

Preferably, the ethylene vinyl acetate used has a density comprised between 0.08 and 0.12 g/cm$^3$, a breaking load comprised between 10 and 14 kg/cm$^2$, an elongation at break comprised between 200 and 300%, a tearing degree comprised between 1.5 and 2.5 kg/cm, a compression degree comprised between 50% and 70%, and a hardness either comprised between or equal to 16-21 Shore A, with the latter tending to change as the ambient temperature changes.

The present invention further relates to a vehicle wheel 2 comprising
a tire 4 and a rim 5 on which the tire 4 is mounted; and an insert 1 according to the present invention, mounted in an inner annular cavity 3 that results between the tire 4 and the rim 5.

According to a particularly advantageous embodiment, the inner diameter D of the insert 1 when the insert is not mounted onto the rim 5 is shorter in length than the rim inner diameter Dc, so that when the insert 1 is mounted on the rim 5 it applies a radial pressure onto said rim 5 to stabilize the adhesion of the rim 1.

Preferably, the insert 1 is shaped and sized so that it does not entirely occupy the volume of the inner annular cavity 3.

Preferably, the tire insert 1 occupies a volume at most 80% of the total volume of the resulting inner annular cavity 3 between the tire 4 and the rim 5. More preferably, the tire insert 1 occupies a volume of at most 60% of the total volume of the inner annular cavity 3, even more preferably a volume of at most 50% of the total volume of the inner annular cavity 3.

According to an embodiment, the insert 1 is housed in the inner annular cavity 3 and remains distanced from the tire 4 when the tire is inflated at a standard wheel working pressure.

Innovatively, the present invention brilliantly overcomes the drawbacks of the tire inserts of the prior art.

Advantageously, the presence of dips or protrusions allows passage of air during the inflation of the tire.

Furthermore, the frequency with which the dips and protrusions are made and the at least partial extension over all the walls of the annular element advantageously allow matching the air injection point with a dip or the space created between two protrusions, making it easier to adjust the insert in the inner annular cavity.

Advantageously, the construction shape with spiral dips allows for a preferential path for air to pass through during inflation, so that air is evenly distributed throughout the free volume of the inner annular cavity.

Advantageously, the toroidal shape of the annular element makes the insert extremely versatile and suitable for application on different variants of vehicle wheels.

Advantageously, the shape and size of the insert, with the base portion and enlarged portion, reduce the lateral encumbrance and, above all, apply no pressure onto the sidewalls of the tire.

In this manner, the tire, free from sidewall contact, can work at its best. The vehicle ride is smoother and more precise when cornering while being unaffected by the presence of the insert, returning to the dynamic design performance of the wheel, under most driving conditions.

It is apparent that the present invention is preferentially intended for tubeless wheels.

To meet specific requirements, a person skilled in the art may make variants or replace elements with other functionally equivalent ones to the embodiments of the present invention.

Such variants are also contained within the scope of protection as described and claimed herein.

What is claimed is:

1. An insert for a vehicle wheel suitable for being inserted in an inner annular cavity resulting between a tire and a rim of the vehicle wheel, said insert comprising an annular element extending in a circumferential direction (C) about a main axis (X-X), said insert being made in one piece of polymeric material and having an upper surface suitable for facing towards a tread inner side opposite to a tread of the tire and arranged in the inner annular cavity, a right sidewall and a left sidewall suitable for facing towards a right lateral wall and a left lateral wall of the tire, respectively, and a lower surface suitable for at least partially coming into contact with the rim of the vehicle wheel, the upper surface coming into contact, at least partially, with the tire when the tire is deflated, and not touching the tire when the tire is inflated to a predetermined working pressure, wherein dips or protrusions are formed on the annular element, relative to a main encumbrance surface of the annular element, said dips or protrusions each extending at least partially on the upper surface, on the lower surface, on the right sidewall and on the left sidewall of the annular element, about the circumferential direction (C) and prevalently along a respective preferential extension direction (A-A), which lies on a plane secant to said circumferential direction (C) at an acute angle, so that passage of air during tire inflation is facilitated when a point of air injection into the wheel is situated at one of said dips or between two of said protrusions.

2. The insert of claim 1, wherein the dips or protrusions extend continuously about the annular element at least along the respective preferential extension direction (A-A), said respective preferential extension direction (A-A) extending at least for one complete turn about the circumferential direction (C).

3. The insert of claim 1, wherein the dips or protrusions extend only for a stretch of said annular element along said respective preferential extension direction (A-A).

4. The insert of claim 1, wherein the dips or protrusions extend about the entire circumferential direction (C), i.e., along an entire extension of the annular element along said respective preferential extension direction (A-A).

5. The insert of claim 1, wherein the dips or protrusions have a spiral pattern about the circumferential direction (C).

6. The insert of claim 1, wherein the dips or protrusions are a spiral-shaped single cavity or protrusion that turns about the circumferential direction (C) throughout the whole annular element.

7. The insert of claim 1, wherein the annular element is a solid toroid on which said dips or protrusions are formed.

8. The insert of claim 1, wherein the annular element is a spiral that turns about the circumferential direction (C).

9. The insert of claim 1, wherein the dips or protrusions have a depth or thickness comprised between 5% and 90% of a total radial height of the insert, respectively.

10. The insert of claim 1, wherein the dips or protrusions have a depth or thickness comprised between 20% and 70% of a total radial height of the insert, respectively.

11. The insert of claim 1, wherein the insert is entirely made of an expanded polymeric material.

12. A vehicle wheel comprising
a tire and a rim on which the tire is mounted; and
an insert according to claim 1, mounted in an inner annular cavity resulting between the tire and the rim.

13. The vehicle wheel of claim 12, wherein an inner diameter of the insert when the insert is not mounted on the rim, is shorter in length than a rim inner diameter, such that when the insert is mounted on the rim the insert applies a radial pressure on said rim to stabilize adhesion of the rim.

14. The vehicle wheel of claim 12, wherein shape and size of the insert are such that the insert does not entirely occupy a volume of the inner annular cavity.

15. The vehicle wheel of claim 12, wherein the insert remains distanced from the tire at the predetermined working pressure.

16. The insert of claim 1, wherein the annular element comprises a base portion suitable for being accommodated in a rim seat of the rim and an enlarged portion having a section larger than the base portion.

17. The insert of claim 16, wherein said enlarged portion and said base portion are configured to have shape and size such that said enlarged portion and said base portion always remain distanced from the tire.

18. The insert of claim 16, wherein the enlarged portion has a bowl-shaped section.

* * * * *